United States Patent
Akgulian et al.

[15] 3,662,528
[45] May 16, 1972

[54] ROLLER FOR REEL TYPE LAWN MOWERS

[72] Inventors: Sahag C. Akgulian; Donald G. Haffner, both of Racine, Wis.

[73] Assignee: Jacobsen Manufacturing Company, Racine, Wis.

[22] Filed: June 10, 1970

[21] Appl. No.: 44,919

[52] U.S. Cl. .................................................56/249
[51] Int. Cl. ..................................................A01d 55/20
[58] Field of Search............................56/249–254; 180/20

[56] References Cited

UNITED STATES PATENTS

| 2,334,086 | 11/1943 | Greiner | 180/20 |
| 992,499 | 5/1911 | Guy | 56/249 |
| 621,901 | 3/1899 | Cornelius | 56/251 |
| 2,528,116 | 10/1950 | Clemson | 56/249 |

FOREIGN PATENTS OR APPLICATIONS

| 255,016 | 1/1949 | Switzerland | 56/251 |
| 536,568 | 5/1941 | Great Britain | 56/249 |
| 591,281 | 12/1945 | Great Britain | 56/249 |

*Primary Examiner*—Louis G. Mancene
*Assistant Examiner*—J. N. Eskovitz
*Attorney*—Arthur J. Hansmann

[57] ABSTRACT

A roller for a lawn mower of the reel type, and with the roller extending for the length of the reel and across the width of the mower. The roller is rotatably mounted, and it has large diameter portions on opposite ends, and it has a small diameter portion in the middle of the length of the roller. The end large portions engage the ground and support the mower at the spaced-apart locations of the large portions, and the smaller diameter middle portion of the roller presents an anti-scalping member for the mower. The roller includes a base tube or cylinder, and rotation bearings fit within the ends of the tube for rotatably supporting the roller on the mower. The large diameter portion is shown to be a plurality of rubber rings which are pressed onto the ends of the tube and which therefore rotate with the tube, as one rotatable roller.

7 Claims, 4 Drawing Figures

PATENTED MAY 16 1972   3,662,528

INVENTORS:
SAHAG C. AKGULIAN
DONALD G. HAFFNER

Arthur J. Hinemann
ATTORNEY

ROLLER FOR REEL TYPE LAWN MOWERS

This invention relates to a roller for a reel type lawn mower.

BACKGROUND OF THE INVENTION

Reel type lawn mowers are commonly provided with rollers which extend for the length of the reel, that is, across the width of the mower, for supporting the mower on the ground. These mowers may also have ground engaging wheels, skids, or other additional means for supporting the mower and moving it on the ground. In all instances, it is important that the roller lend end-to-end support to the reel type mower, so that the cutting reel can be placed parallel to the ground, even though the ground may be inclined, and the ground may be irregular.

Another concern with regard to roller supported reel type mowers is that the roller presents a central portion which will support the mower in the event that the center of the mower engages a rise in the ground. That is, the roller must be available for preventing the mower from cutting too close, or scalping, when a rise in the ground is encountered at the center of the mower. However, where the roller is provided with an outer diameter of essentially one size for the entire length of the roller, the roller does not give end-to-end support to the mower when the mower meets a ground rise at the center of the mower. In that instance, the ground rise tips the mower so that both ends of the mower might be off the ground, and the mower is then bouncing end-to-end and causing excessive wear or even damage to the mower, as well as causing an irregular cut to the lawn.

The main object of the present invention is to provide a roller which gives both the end-to-end mower support and the anti-scalping support for the mower. In accomplishing this object, the roller of the present invention is arranged so that when slight irregularities in the ground are encountered at the center of the mower, the mower is completely stable and does not bounce or vibrate in response to a slight center rise in the ground. However, if the ground center rise is sufficiently high that it would be cut too close or scalped if the mower ran directly into it, then, in that instance, the roller of the present invention becomes effective to prevent the scalping but, it still also precludes common bouncing or vibrating of the mower when the mower is provided only with the rollers of the type known in the prior art.

Still further, the roller of this invention accomplishes the aforementioned ultimate objective, and it overcomes the problems described and it does so with a roller which cushions the movement of the mower over the ground. Still further, the roller of this invention is sturdy but yet easily manufactured and can be disassembled for inspection and repair, if needed.

Still further, the roller of this invention has particular application to a reel type mower which is supported on a tractor and which has a center pivot support which permits the mower to pivot end-to-end for adjusting itself to the slope of the ground or to irregularities in the ground. In this use of the roller of this invention, it is therefore significant that the roller provides the end-to-end ground support for the tiltable mower, and it is also important that the roller prevents the mower from scalping if a ground rise is encountered by the center of the mower.

DETAILED DESCRIPTION OF THE PREFERRED EMBODIMENT

Figure 1:
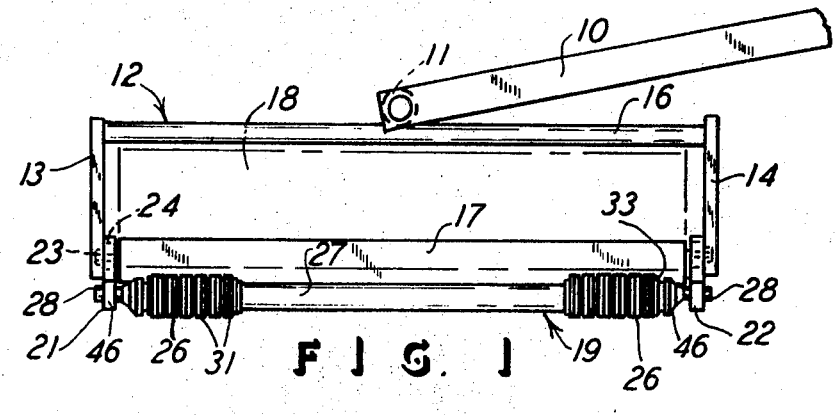
FIG. 1 is a rear elevational view of a mower with the roller attached thereto.

FIG. 1 shows that the reel type lawn mower utilizing this roller may be a gang mower supported by a tractor (not shown) having an arm 10 extending laterally of the tractor and presenting a sleeve and shaft pivot assembly 11 which has its axis extending in the fore-and-aft direction of mowing movement of the mower which is generally designated 12. Thus, it will be understood that the mower can pivot about the support or assembly 11, so that the mower will move up and down end-to-end, in response to undulations or irregularities in the ground being traversed by the mower. The mower 12 has side members 13 and 14, and it has an inter-connecting member 16. Also, a bed knife 17 is shown, and the mower reel 18 is shown in dot-dash lines, and it will be understood that the mower 12 is generally of a conventional reel type construction, and the reel 18 has its longitudinal axis extending for substantially the width of the mower 12, as seen in FIG. 1. It will therefore be understood that the bed knife 17 and the reel 18 are disposed to present their respective cutting edges at an elevation above the ground, as is commonly the arrangement, and, a roller 19 is rotatably mounted on the mower 12 to support the mower on the ground and to maintain the cutting members at a desired elevation.

Support members 21 and 22 are shown suitably affixed to the mower side members 13 and 14, such as by the bolts 23 received in the slots 24 in the members 21 and 22, so that the members 21 and 22 can be adjusted vertically for respective up-and-down adjustment of the roller 19.

Fig. 1 shows that the roller 19 is basically arranged to have its opposite ends of a large diameter and to have its middle or intermediate portion of a smaller diameter. Thus, the ends are provided with a cylindrically shaped portion 26, and the center is the cylindrically shaped portion 27. The portion 27 extends for at least one-third the total length of the roller 19, and the roller is shown to terminate in end members 28 projecting through and beyond the support members 21 and 22. With the arrangement shown, the portions 26 roll on the ground and provide the end-to-end or lateral support for the mower 12, and the intermediate portion 27 extends between the end portions 26 and is available for providing the anti-scalping support for the mower 12, and the portion 27 would therefore raise the mower if and when the center portion of the mower, that is the portion where the roller length 27 is aligned and located, were to meet a rise in the ground.

Figure 2:
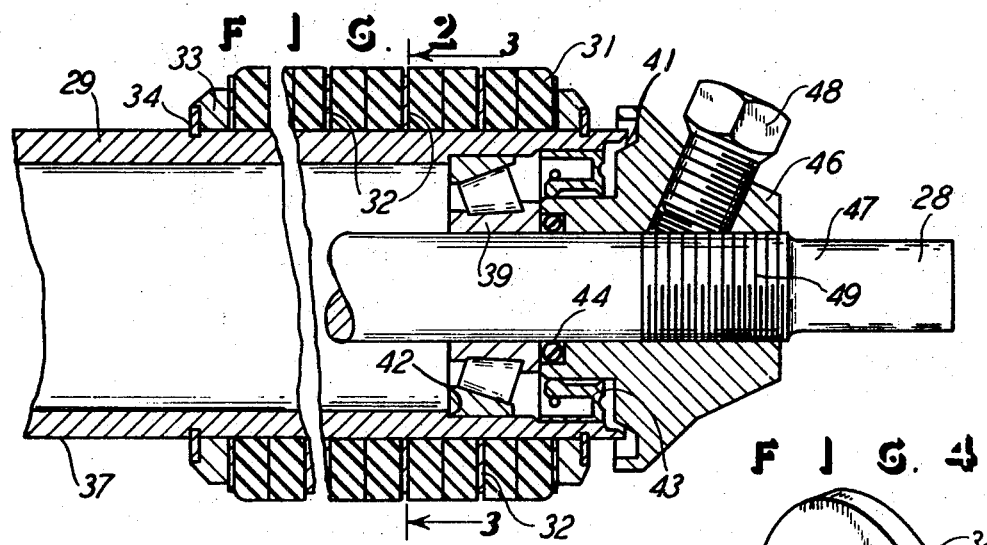
FIG. 2 is an enlarged longitudinal sectional view of either end of the roller shown in FIG. 1, and with parts broken away.
Figure 3:
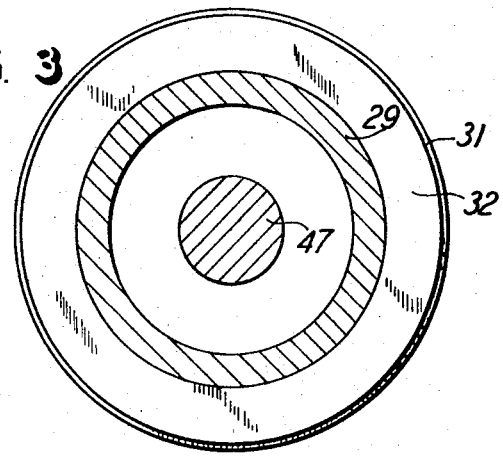
FIG. 3 is a sectional view taken on the line 3—3 of FIG. 2.
Figure 4:
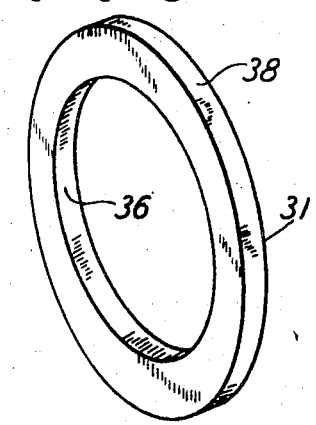
FIG. 4 is a perspective view of one of the rings forming a portion of the roller shown.

FIG. 2 shows that the roller consists of a base piece 29 which is shown to be tubular, and the portions 26 are shown to be a plurality of rings 31 snugly fit over the ends of the tube 29 and which therefore rotate with the rotation of the tube 29. Also, the rings 31 are shown to be of a rubber material, and they thereby provide the cushioned support for the roller to minimize vibration to the mower. Also, metal disks 32 are included in the portions 26 and are disposed between each two rubber rings 31, as shown in FIG. 2. The portions 26, consisting of the compressed stack of rubber rings 31 and metal disks 32, are then axially retained on the tube 29 by means of the end collars 33 and snap rings 34. In actual assembly and construction, the inner snap ring 34 and collar 33 could be applied to the tube 29, and then the stack of rings 31 and 32 can be slipped onto the tube 29. Subsequently, the stack of rings is then compressed, and the end collar 33 and its retaining ring 34 are then applied and compression is relieved so that the portion 26 is then retained between the collars 33, and the portion 26 is still sufficiently snug on the tube 29 to be non-rotatable thereon so that the tube 29 and the portion 26 all rotate together as the portions 26 roll over the ground. FIGS. 3 and 4 show further details in the construction of the rings 31 and 32, and it will then be understood that the inner diameters or circumferential surfaces 36 of the rings 31 are sufficiently snug on the outer circumferential surface 37 of the tube 29 so that the stack of rings and tube 29 will rotate together when the roller is riding on the ground. The drawings show the rings 31 to be of a thickness which is less than the radial wall dimension of the ring 31 extending to only one side beyond the surface 37. With the arrangement described, it will again be seen and understood that the tube 29 presents the smaller outer diameter defining its circumferential surface 37, compared to the outer diameter of the rings 31 and defining the outer circumferential surface 38 of the rings 31, and therefore of the portion 26. That is, the roller intermediate length 27 is defined by a smaller diameter, or it can be described as being a relieved portion, compared to the end portions 26.

In order to achieve end-to-end stability for the mower 21, and to still present an anti-scalping section on the roller 19, the intermediate portion 27 is at least one-third of the entire length of the roller 19. Thus the portions 26 are available for sufficient wear in that they are sufficiently large and sturdy, but, they do not extend to the center portion of the mower to interfere with stability of the mower when the center portion is encountering a rise in the ground. Also, the relationship in outer diameters between the tube 29 and the stack of rings 31 is substantially two to three, in diametrical sizes.

FIG. 2 shows that a roller bearing 39 is disposed within the end edge 41 of the tube 29, and a similar bearing would also be provided on the other end of the tube 29. The bearing 39 is shown against a shoulder 42 on the tube 29, and an oil seal 43 and an O-ring 44 are both disposed within the end of the tube 29. Finally, an end cap 46 is provided on each end of the tube 29, and the cap supports the seals 43 and 44, and it bears against the bearing 39, all as shown. Also, a center shaft 47 extends through the end caps 46 and through the tube 29, and a set screw 48 secures the shaft 47 in position.

With the arrangement shown, the roller is fully assembled, and oil may be placed within the tube 29 for lubricating the bearings 39. It is significant to note that the bearings 39 and the seals 43 and 44 are thus within the end edges 41 of the tube 29, and the entire assembly is therefore compact, sturdy, and can be readily made or dis-assembled for replacement of parts. No welding or permanent connection of parts is required, but the roller 19 extends from end to end of the mower 12, and is actually adjustable in its end-to-end extent, by virtue of the arrangement of end caps 46 and shafts 47 and their threads 49, and it is understood that the caps 46 are the extension portion of the support members 21 and 22 in that the plane of the section in FIG. 2 is simply running through the lower ends of the support members 21 and 22.

The length of the anti-scalping portion is at least one-third the total length of the roller, and that amount has been found to be the answer to presenting an anti-scalping portion which also permits end-to-end mower stability by having the relieved or smaller diameter center portion. Further, the diameters are in two to three relationship. These are important relationships found to be the answers for mower stability with anti-scalping, on ordinarily irregular terrain of the commercial or public type.

What is claimed is:

1. In a roller for a lawn mower of the type having a cutting reel with its length extending across the width of the mower, roller mounting members on each side of said lawn mower and extending rearwardly of said cutting reel relative to the fore-and-aft direction of said mower, a roller rotatably mounted on said mounting members and extending between the latter and parallel to and for the length of said reel, said roller having a first circumferential surface extending throughout the intermediate length of said roller for at least one-third the entire length of said roller for presenting an anti-scalping support for said reel, said roller having an additional circumferential surface of a diameter larger than the diameter of said first circumferential surface and on each end of said roller and contiguous to said first circumferential surface for supporting the mower on the ground at the locations of the spaced-apart said additional circumferential surfaces, the improvement comprising each said additional circumferential surface being provided by a stack of flat rubber rings compressed onto each end of said first circumferential surface and being affixed thereto to rotate with said first circumferential surface.

2. The roller as claimed in claim 1, wherein each of said rubber rings is of a thickness less than the radial wall dimension of said rubber ring, and the inner diameter of each of said rings is substantially the dimension of the outer diameter of said first circumferential surface.

3. The roller as claimed in claim 2, including a stop on said first circumferential surface at each end of said stack of rings, for affixing said stacks onto said first circumferential surface.

4. The roller as claimed in claim 1, including support rings of a rigid material and of an outer diameter less than that of said rubber rings and disposed in said stack intermediate said rubber rings.

5. In a roller for a lawn mower of the type having a cutting reel with its length extending across the width of the mower, roller mounting members on each side of said lawn mower and extending rearwardly of said cutting reel relative to the fore-and-aft direction of said mower, a roller rotatably mounted on said mounting members and extending between the latter and parallel to and for the length of said reel, said roller including a rotatable tubular base piece extending across the length of said reel and having an exposed outer circumferential surface extending throughout the intermediate length of said base piece for presenting an anti-scalping support for said reel, cylindrically shaped means on each end of said base piece and having an outer circumferential surface of a diameter larger than the diameter of the circumferential surface of said base piece for supporting the mower on the ground at the locations of the spaced-apart said cylindrically shaped means, said base piece being a hollowed piece and a rotation bearing disposed within each end of said base piece and fully within the end limits thereof for the rotatable mounting of said base piece, the improvement comprising said cylindrically shaped means both being a plurality of flat rings of rubber material in compact relation adjacent each other and having an inner ring diameter of a snug fit with the outer circumference of said base piece to rotate in unison with the rotation of said base piece.

6. The roller as claimed in claim 5, including a shaft extending through said base piece for rotatably supporting said bearings and having a length of threads on the ends of said shaft, and an end cap adjacent each said bearing and being threaded with and along said threads on said shaft for selective axial shifting of said roller relative to said mower.

7. The roller as claimed in claim 5, including an oil seal disposed in each end of said base piece and axially outwardly from said bearings, for retaining oil in said base piece and on said bearings.

* * * * *